(12) United States Patent
Smith et al.

(10) Patent No.: US 10,780,924 B2
(45) Date of Patent: Sep. 22, 2020

(54) BOGIE FOR A LOWBOY TRAILER

(71) Applicant: Fontaine Commercial Trailer, Inc., Springville, AL (US)

(72) Inventors: John R. Smith, Talladega, AL (US); Gregory C. Benson, Pell City, AL (US)

(73) Assignee: Fontaine Commercial Trailer, Inc., Springville, AL (US)

( * ) Notice: Subject to any disclaimer, the term of this patent is extended or adjusted under 35 U.S.C. 154(b) by 237 days.

(21) Appl. No.: 15/938,150

(22) Filed: Mar. 28, 2018

(65) Prior Publication Data
US 2018/0290690 A1 Oct. 11, 2018

Related U.S. Application Data

(60) Provisional application No. 62/481,994, filed on Apr. 5, 2017.

(51) Int. Cl.
*B62D 21/20* (2006.01)
*B62D 53/06* (2006.01)

(52) U.S. Cl.
CPC .......... *B62D 21/20* (2013.01); *B62D 53/061* (2013.01); *B62D 53/065* (2013.01)

(58) Field of Classification Search
CPC ...... B62D 21/20; B62D 53/06; B62D 53/061; B62D 53/065
See application file for complete search history.

(56) References Cited

U.S. PATENT DOCUMENTS

| | | | |
|---|---|---|---|
| 3,151,884 A | 10/1964 | Felburn | |
| 3,517,945 A * | 6/1970 | Fikse | B62D 53/065 |
| | | | 280/441.2 |
| 3,704,898 A * | 12/1972 | Schmidt | B60G 17/052 |
| | | | 280/124.128 |
| 3,817,545 A * | 6/1974 | Ward | B60P 3/32 |
| | | | 280/638 |
| 3,967,743 A * | 7/1976 | Yoder | B60P 3/40 |
| | | | 414/458 |
| 4,991,872 A | 2/1991 | Richardson | |

(Continued)

OTHER PUBLICATIONS

Rac Export Trading, "PM3R—Central Low Load Deck Semi-Trailers 3 Axles," Brochure, date unknown, available at https://www.rac-germany.com/fileadmin/user_upload/products/trailers/new/low_bed/pm3r_brochure.pdf, last accessed Mar. 27, 2018.

(Continued)

*Primary Examiner* — Frank B Vanaman
(74) *Attorney, Agent, or Firm* — Andrus Intellectual Property Law, LLP (57) ABSTRACT

A bogie for a lowboy trailer includes a rear suspension support assembly configured to carry a suspension system of the lowboy trailer thereunder and a front transition assembly coupled to a front end of the rear suspension support assembly and configured to couple the rear suspension support assembly to a lower deck of the lowboy trailer. At least a portion of the rear suspension support assembly has a closed cross section when viewed along a longitudinal axis of the rear suspension support assembly. At least a portion of the front transition assembly has a closed cross section when viewed along a longitudinal axis of the front transition assembly.

16 Claims, 4 Drawing Sheets

(56) References Cited

U.S. PATENT DOCUMENTS

| | | | | |
|---|---|---|---|---|
| 5,210,921 | A * | 5/1993 | Booher | B23P 15/00 |
| | | | | 228/173.4 |
| 5,394,959 | A * | 3/1995 | Cullity | B66B 9/16 |
| | | | | 180/414 |
| 8,591,155 | B2 | 11/2013 | Lawlor et al. | |
| 8,801,000 | B1 | 8/2014 | Power | |
| 9,050,875 | B2 | 6/2015 | Holt et al. | |
| 9,150,248 | B2 | 10/2015 | Crisp et al. | |
| 9,422,013 | B2 | 8/2016 | Graham | |
| 9,422,015 | B1 | 8/2016 | Fraley et al. | |
| 2006/0082100 | A1 * | 4/2006 | Gross | B62D 53/061 |
| | | | | 280/423.1 |
| 2009/0174171 | A1 * | 7/2009 | Maiorana | B62D 21/20 |
| | | | | 280/423.1 |
| 2009/0315297 | A1 * | 12/2009 | Nadeau | B62D 21/20 |
| | | | | 280/407.1 |
| 2012/0248736 | A1 * | 10/2012 | Dierks | B62D 53/062 |
| | | | | 280/425.2 |
| 2015/0084314 | A1 * | 3/2015 | Ingels | B62D 21/14 |
| | | | | 280/656 |
| 2016/0311470 | A1 * | 10/2016 | Smith | B62D 53/068 |
| 2017/0217353 | A1 | 8/2017 | Vander Pol et al. | |

OTHER PUBLICATIONS

RC4WD, "RC4WD 1/14 Lowboy Trailer," Website, availabel at least as early as Oct. 14, 2015, available at https://store.rc4wd.com/RC4WD-114-Lowboy-Trailer_p_4178.html, last accessed Mar. 21, 2018.

* cited by examiner

BOGIE FOR A LOWBOY TRAILER

CROSS-REFERENCE TO RELATED APPLICATION

The present application claims priority to and the benefit of U.S. Provisional Application Ser. No. 62/481,994, filed Apr. 5, 2017, which is hereby incorporated by reference herein in entirety.

FIELD

The present disclosure relates lowboy trailers, and more specifically to bogies for holding suspension systems for lowboy trailers.

BACKGROUND

A lowboy trailer bogie's purpose is to transition from a low-profile deck of the trailer to a structural section that positions the suspension system. The front region of a bogie most often houses yoke-mount suspension arms within its structure to maximize trailer deck length and connects the rearmost section of the trailer deck to a rear suspension support region. The suspension support region positions the suspension hanger brackets and air bag plates and incorporates a platform between the suspension hangers that supports the boom arm of loaded equipment. Bolsters are cantilevered beams that extend transversely outward from the rear suspension support region in between the tires. The bolsters provide additional positions for placing loaded equipment and/or act as a path for equipment to drive off of the trailer when unloading onto a dock or elevated surface.

U.S. Pat. No. 4,991,872 discloses an axle suspension assembly for a low-bed trailer wherein the frame is formed of I-beams at each side thereof and each I-beam has an intermediate portion sloping upwardly and rearwardly between a low central portion and a higher rear portion. The customary trailing arm or equalizing beam is pivotally mounted on the web of this sloping portion of the I-beam utilizing a bushing assembly. Basically, the bushing assembly includes two pivot brackets which are bolted to opposite sides of the web and which carry, by way of a resilient bushing a bushing core through which a fastener may pass so as to clamp opposite arms of a yokelike forward portion of the trailing arm to the bushing core. The bushing core passes through an opening formed in the web with the opening being elongated in a fore and aft direction whereby the bushing assembly may be adjusted so as to accurately position the mounted axle transversely of the trailer frame. Each pivot bracket includes a collar and in a preferred embodiment of the bushing, separate bushings are pressed into the collars with the bushings being bonded to separately formed bushing cores.

U.S. Pat. No. 9,422,013 discloses a modular trailer system, wherein a gooseneck, deck, and dolly are attachable to each other in a variety of ways. One configuration allows the gooseneck and dolly to be attached to either end of the deck. Another configuration allows the gooseneck and dolly to be attached directly to each other. This permits the method of transporting a deck to a site, and then returning the gooseneck and dolly to another location.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a bogie for a lowboy trailer comprises a rear suspension support assembly configured to carry a suspension system of the lowboy trailer thereunder and a front transition assembly coupled to a front end of the rear suspension support assembly and configured to couple the rear suspension support assembly to a lower deck of the lowboy trailer. At least a portion of the rear suspension support assembly has a closed cross section when viewed along a longitudinal axis of the rear suspension support assembly. At least a portion of the front transition assembly has a closed cross section when viewed along a longitudinal axis of the front transition assembly.

According to another example, a bogie for a lowboy trailer comprises a front transition assembly comprising parallel left and right arms, each of the left and right arms having a lower front end, an upper rear end, and an intermediate crest region connecting the lower front end to the upper rear end. The bogie also includes a rear suspension support assembly coupled to the upper rear ends of the left and right arms of the front transition assembly, the rear suspension support assembly including a trough section having a horizontally oriented center pan. Each intermediate crest region on the respective left and right arms of the front transition assembly comprises an undersurface including a radiused corner having an angle of less than 100 degrees.

BRIEF DESCRIPTION OF THE DRAWINGS

The present disclosure is described with reference to the following Figures. The same numbers are used throughout the Figures to reference like features and like components.

FIGS. 1 and 2 illustrate one example of a bogie according to the prior art, wherein

FIGS. 3-6 illustrate an example of a bogie according to the present disclosure, wherein

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
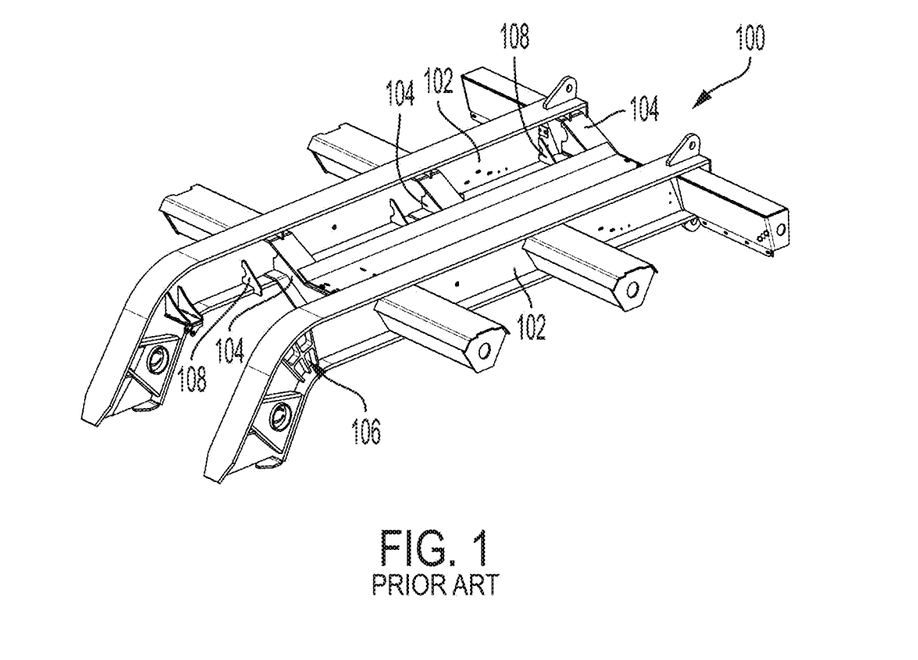
FIG. 1 is a front perspective view thereof.
Figure 2:
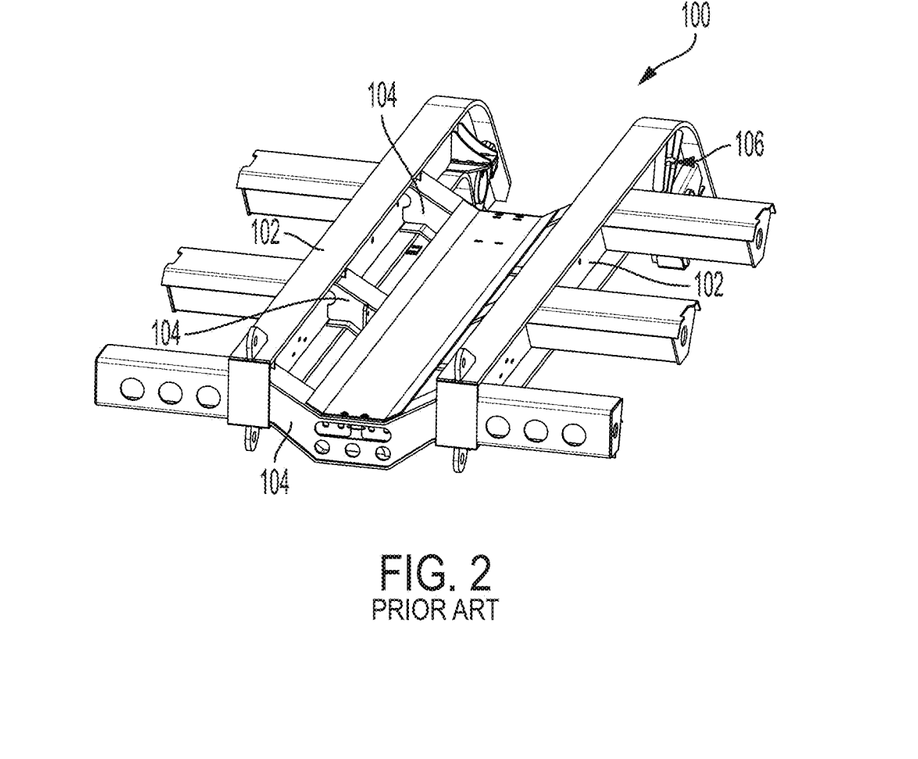
FIG. 2 is a rear perspective view thereof.
Figure 6:
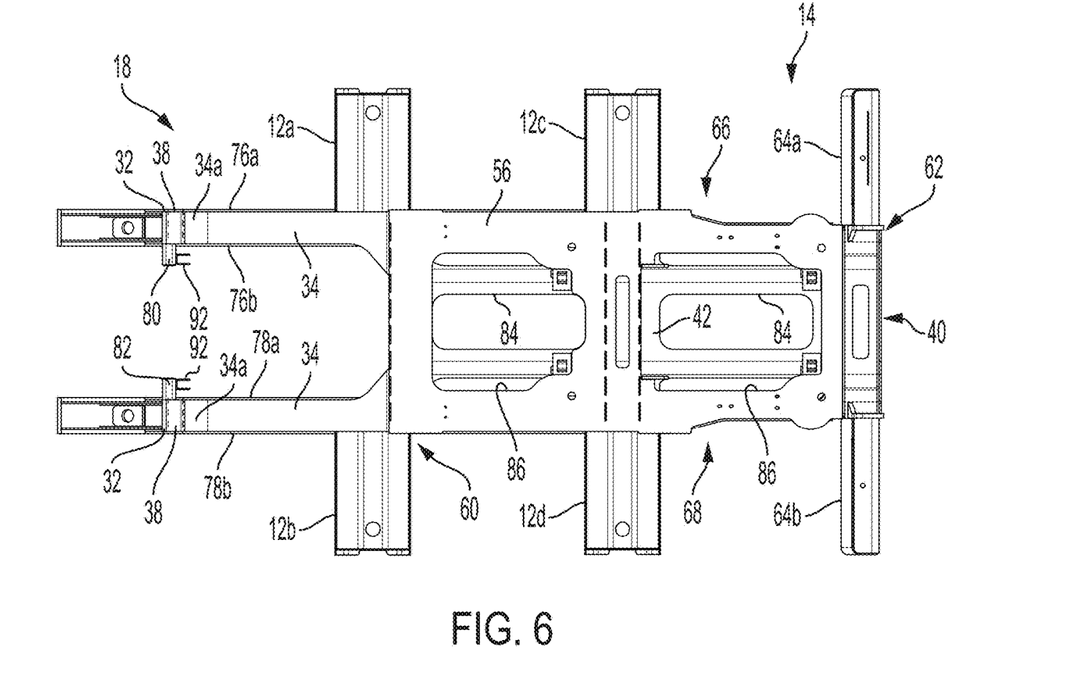
FIG. 6 is a bottom plan view thereof.
Figure 7:
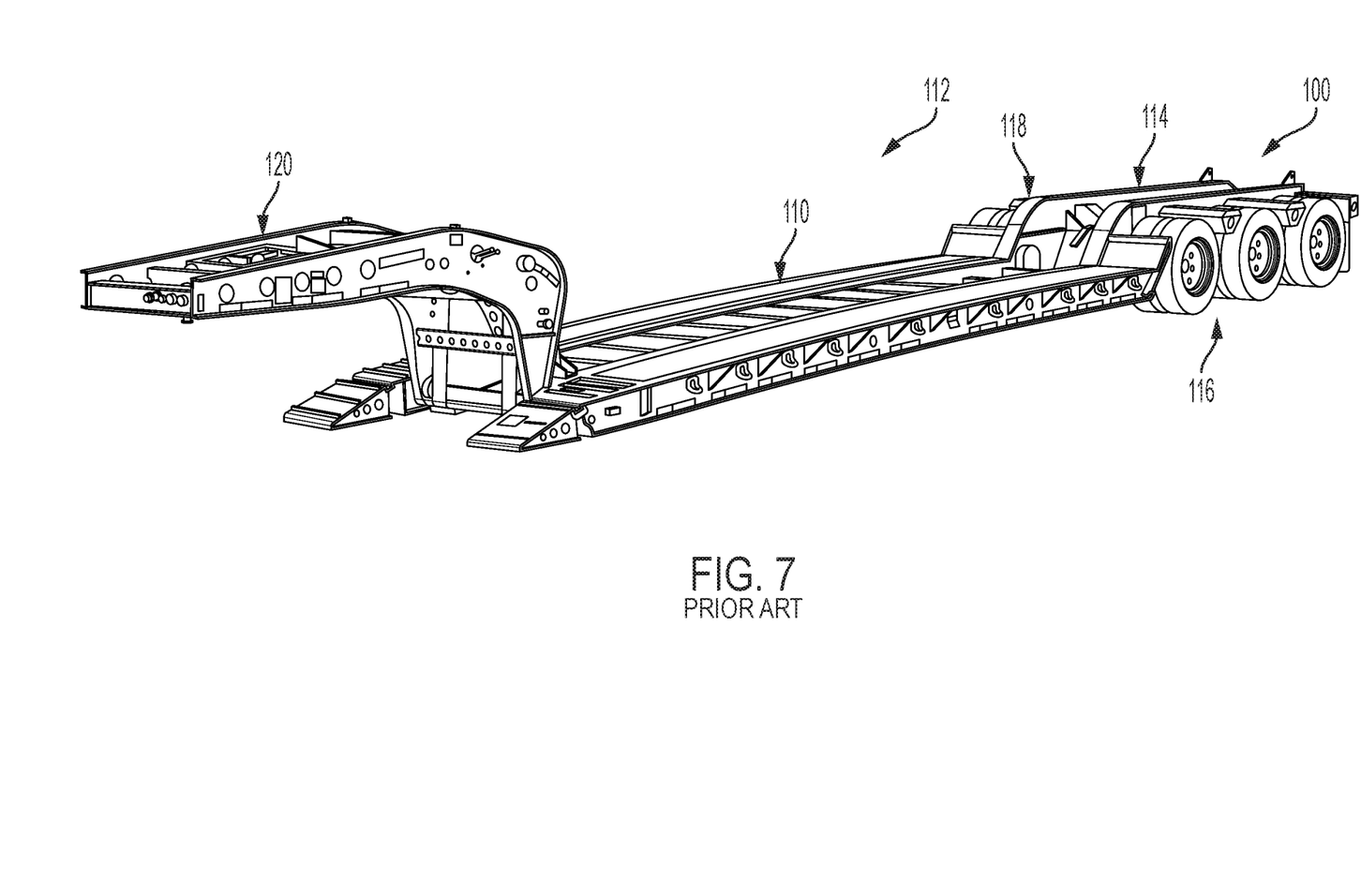
FIG. 7 shows a lowboy trailer equipped with a bogie according to the prior art.

Referring to FIG. 7, as noted above, a bogie's purpose is to transition from a low profile deck 110 of a lowboy trailer 112 to a structural region 114 which positions the suspension system 116 (e.g. tires, air bags, springs, shock absorbers, etc.). Therefore, the bogie 100 can be thought of as having two distinct sections: a transition region 118 and a spanned, suspension support structural region 114. With conventional designs, these two regions 114, 118 are built with one pair of longitudinal I-beam members which are held together by transverse I-beam members. For example, FIGS. 1 and 2 show a prior art design for a lowboy bogie 100, which utilizes two longitudinal main beams 102 and multiple cross members 104 in the transverse direction, as well as additional pieces (e.g., piece parts 106, 108) to mount suspension components and add reinforcement. This construction approach yields a relatively large piece count. Conventional bogie designs do not allow for tailored construction or optimization of each region 114, 118. Through research and development, the present inventors have realized that each region 114, 118 experiences unique loading based upon trailer inputs and should be optimized for strength, durability, and weight. The present bogie design considers these differences in loading and provides an optimized solution. Referring to FIGS. 3-6, the present bogie 10 performs the functions of a conventional lowboy bogie 100, but is constructed with two unique and individual regions or assemblies 14, 18. The transition assembly 18 utilizes box beams (as opposed to I-beams with multiple strength enhancement pieces), and the suspension support assembly 14 utilizes a unitized, nested structure to enhance performance and durability.

The transition assembly 18 is generally exposed to two types of loading: (1) vertical, out of plane loads, which lift the trailer and are a result of rotationally balancing the suspension air bag pressure and the suspension arm's yoke mount about the axle; and (2) internal beam loads, which are a result of trailer loading and external stimulus from road and tire contact. Therefore, expected transition region loading due to inputs includes longitudinal bending, transverse bending, and torsion. Typical loadings for the suspension support assembly 14 are similar to those for the transition assembly 18, with a distinction being made due to the influence from the trailer itself. Because the transition assembly 18 connects the trailer deck to the suspension support assembly 14, its main inputs are a result from linking these two pieces. The suspension support assembly 14 naturally loses its internal beam bending moment unless there is a hydraulic spreader or a stinger attached to the trailer. In these latter instances, significant beam bending moments are input into the rearmost section of the bogie 10. An additional global load the bogie 10 experiences is from bolster loading. Because bolsters 12a-d provide additional positions to place loaded equipment or act as a path for equipment to drive off of the trailer if unloading to an elevated surface, as equipment drives over the bolsters 12a-d, the bogie 10 experiences transverse four-point bending.

Future trends for lowboy trailers will see an increase in the use of air disc brakes, while current technology is centered around the use of drum brakes. Air disc brakes pose a unique challenge because of brake chamber positioning. Conventional bogies require alteration of the structural shape of the transition region 118 based upon brake selection, which results in two distinct weldments for production: one for a drum brake and another for a disc brake. On the other hand, the present design incorporates a tight radius arc at the transition assembly's crest, which allows the presently disclosed bogie 10 to accommodate either brake choice. By optimizing the transition assembly 18 with the known requirement of a tighter radius on the crest, it is possible to economize production by producing one bogie 10.

However, the geometry of the transition assembly's crest affects in-use stresses: the smaller the crest radius, the greater the in-use stresses, which can lead to durability issues. The transition assembly 18 is also susceptible to weld fatigue due to the above-mentioned combined loadings, especially for turning and side-drag events, which amplify these stresses. Conventional bogie transition regions add piece parts to the two longitudinal I-beams 102 to resist the high in-use stresses (see, e.g., piece parts 106 in FIG. 1). By optimizing the transition assembly 18 in the present design, these durability issues are eliminated. The proposed design eliminates the need for elaborate reinforcement by utilizing a different cross section for the transition assembly 18. Box beams with backing plates in the crest area eliminate durability issues by lowering in-use stresses.

For example, still referring to FIGS. 3-6, the bogie 10 of the present disclosure includes a rear suspension support assembly 14 configured to carry a suspension system (e.g., 116, FIG. 7) of the lowboy trailer thereunder. A front transition assembly 18 is coupled to a front end 60 of the suspension support assembly 14 and is configured to couple the suspension support assembly 14 to a lower deck (e.g., 110, FIG. 7) of the lowboy trailer. The transition assembly 18 comprises parallel left and right arms 16a, 16b, each of the left and right arms 16a, 16b having a lower front end 20a, 20b, an upper rear end 22a, 22b, and an intermediate crest region 24a, 24b connecting the lower front end 20a, 20b to the upper rear end 22a, 22b. The lower front ends 20a, 20b are coupled to the lower deck 110, and the upper rear ends 22a, 22b are coupled to the front end 60 of the suspension support assembly 14. Such coupling can be done by way of bolting and/or welding, as well as other mechanical and/or chemical coupling techniques. In one example, each of the left and right arms 16a, 16b of the transition assembly 18 comprises a box beam, which can be made from a single sheet of metal or separate sheets bolted and/or welded together.

Figure 5:
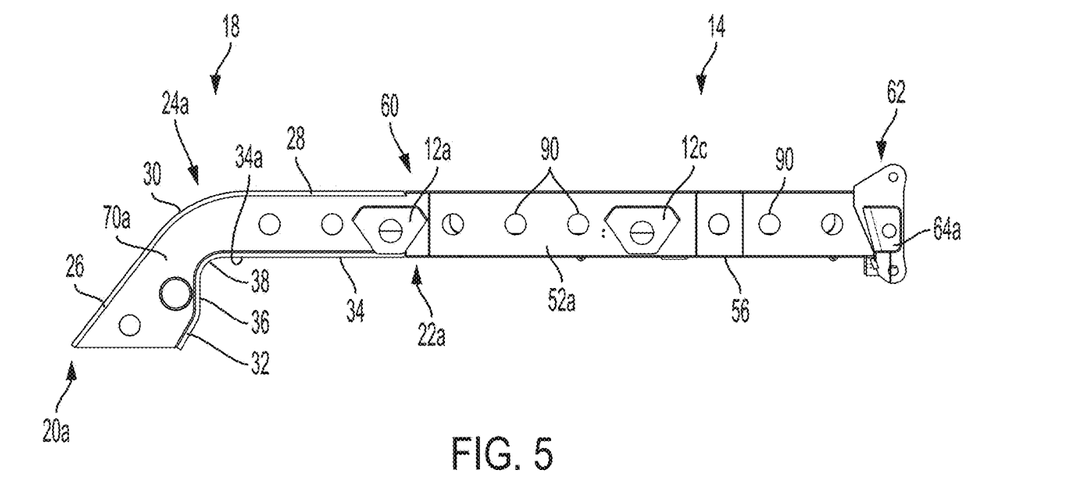
FIG. 5 is a side elevation view thereof.

Referring to FIG. 5, each respective left and right arm 16a, 16b includes a top plate, which includes a top angled portion 26 extending from the lower front end 20a of the respective arm 16a to the intermediate crest region 24a thereof and a top horizontal portion 28 extending from the intermediate crest region 24a to the upper rear end 22a of the respective arm 16a. The intermediate crest region 24a comprises an arced section 30 connecting the top angled portion 26 to the top horizontal portion 28. Note that the angle of the top angled portion 26 with respect to horizontal and the radius of the arced section 30 could be different than those shown herein. Additionally, each respective left and right arm 16a, 16b includes a bottom plate, which includes a bottom angled portion 32 extending from the lower front end 20a of the respective arm 16a to the intermediate crest region 24a thereof and a bottom horizontal portion 34 extending from the intermediate crest region 24a to the upper rear end 22a of the respective arm 16a. The intermediate crest region 24a comprises a vertical portion 36 extending upwardly from the bottom angled portion 32 and a radiused corner 38 connecting the vertical portion 36 to the bottom horizontal portion 34. Note that the bottom angled portion 32 could be removed and the vertical portion 36 could continue to the lower front end 20a of the arm 16a. Additionally, the radius on the radiused corner 38 need not be exactly as shown herein, and other tight radiuses could be used. Additionally, it should be understood that although the top and bottom plates and their respective sections are described herein with respect to the left arm 16a, the same description applies to the right arm 16b.

Referring more specifically to the intermediate crest regions 24a, 24b, both of the intermediate crest regions 24a, 24b on the respective left and right arms 16a, 16b of the transition assembly 18 comprise an undersurface having a vertical segment 36 that is closer to the lower front end 20a of the respective arm 16a than to the upper rear end 22a thereof, a horizontal segment 34a that is closer to the upper rear end 22a than to the lower front end 20a, and a radiused corner 38 connecting the vertical and horizontal segments 36, 34a. The bottom plate of each arm 16a, 16b therefore comprises the undersurface of the intermediate crest region 24a, 24b, the bottom angled portion 32 extending from the lower front end 20a of the respective arm 16a to the vertical segment 36 of the undersurface, and the bottom horizontal portion 34 extending from the horizontal segment 34a of the undersurface to the upper rear end 22a of the respective arm 16a. (Again, the same description holds true for the intermediate crest region 24b of the right arm 16b.)

The radiused corner 38 is configured to hold an actuator for an air disc brake when a suspension assembly equipped with an air disc brake is coupled to the bogie 10. Because drum brake chambers sit on drums between the two main I-beams 102 of prior art designs, the brake chambers can be moved inboard of the main beams 102. However, with disc brakes, the brake pads are squeezed as opposed to being pushed outward. Therefore, the disc brake chambers need to be positioned in a different location, for example, right behind the pivot location of the suspension arm. An aggressive cutout volume (i.e., tight radius) is therefore needed to accommodate the disc brake chambers. The radiused corner 38 on each box beam undersurface provides this aggressive cutout volume. In one example, the radiused corner 38 has an angle of less than 100 degrees. In another example, the radiused corner has an angle of approximately 90 degrees, plus or minus 2 degrees for manufacturing tolerances. As noted, the exact radius of the corner 38 could differ from than shown herein.

Figure 3:
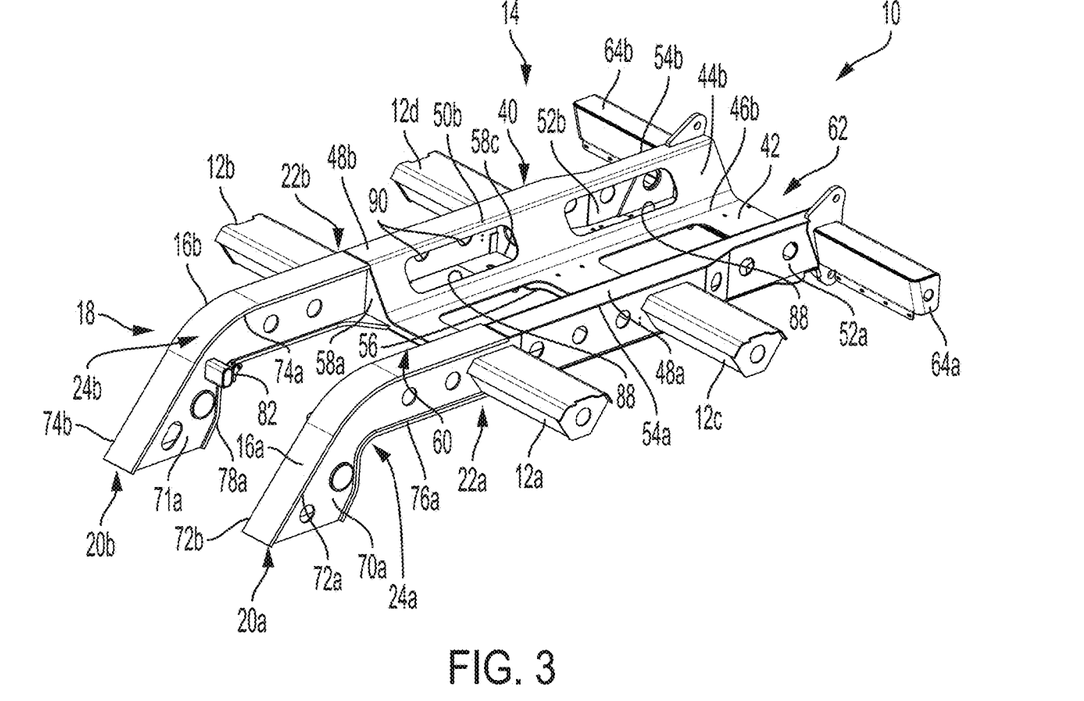
FIG. 3 is a front perspective view thereof.
Figure 4:
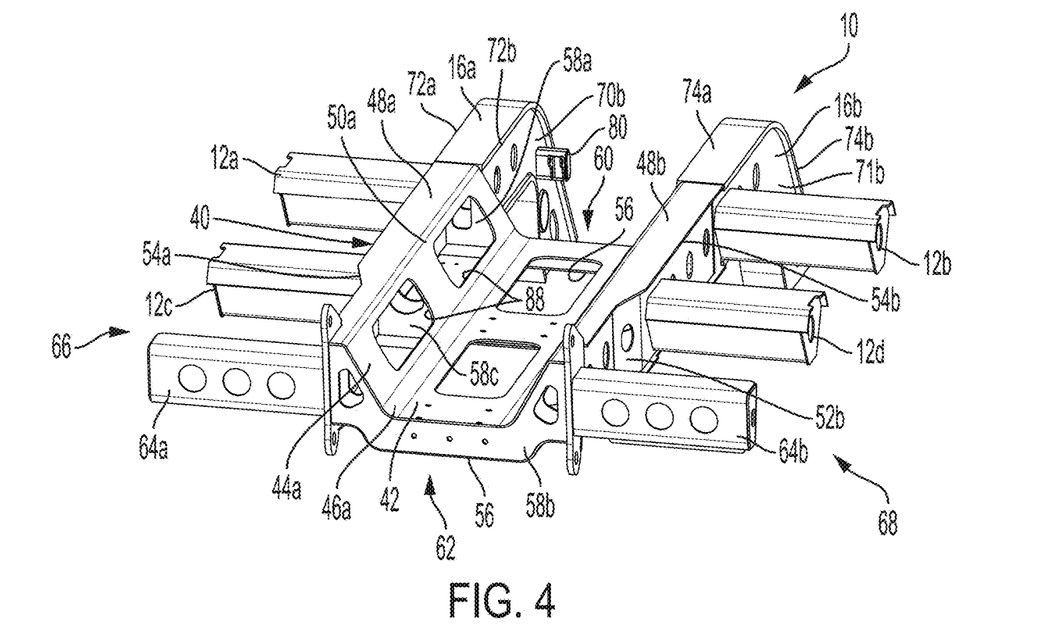
FIG. 4 is a rear perspective view thereof.

Referring to FIGS. 3-6, both of the left and right arms 16a, 16b of the transition assembly 18 further comprise left and right side plates 70a, 70b and 71a, 71b that connect left and right edges 72a, 72b and 74a, 74b of the top plate of the respective arm 16a, 16b to respective left and right edges 76a, 76b and 78a, 78b of the bottom plate of the respective arm 16a, 16b. These side plates 70a, 70b and 71a, 71b, together with the top and bottom plates, close the profile of the "box" of the beams, which are able to handle torsional loads better than the prior art I-beams 102 used in this area. Note that the left and right side plates 70a, 70b and 71a, 71b need not be vertical as shown herein, such as if the top plate or bottom plate of each respective arm 16a, 16b is wider than the other. Referring to FIGS. 3, 4, and 6, the transition assembly 18 further comprises a first rectangular tube 82 extending from the left side plate 71a of the right arm 16b toward the left arm 16a and a second rectangular tube 80 extending from the right side plate 70b of the left arm 16a toward the right arm 16b. The first and second rectangular tubes 82, 80 are configured to hold first and second shock absorbers of the suspension assembly. The rectangular tubes 80, 82 could instead be flat plates. The brackets 92 (FIG. 6) shown on the rectangular tubes 80, 82 can be flipped to accommodate a shock absorber for either a disc brake or a drum brake.

Referring again to each of FIGS. 3-6, the suspension support assembly 14 is coupled to the upper rear ends 22a, 22b of the left and right arms 16a, 16b of the transition assembly 18. The suspension support assembly 14 positions suspension hanger brackets and air bag plates and incorporates a lowered center channel between the suspension hangers to support and decrease the vertical height of loaded equipment boom arms, which nest down into the center channel. The length of the suspension support assembly 14 is dependent upon axle spacing, with typical axle spacing of 54.5 or 60 inches. By designing the suspension support assembly 14 as a nested construction, it is possible to avoid using two longitudinal main beams 102 with cross members 104 (see FIGS. 1 and 2). The suspension support assembly 14 of the present bogie 10 instead includes a formed top sheet (trough section 40), internal stiffening members (brace plates 58a-c), peripheral webs (outer side plates 52a, 52b), and a flat bottom sheet (bottom plate 56). The result is a nested and encapsulated span region. In another example, the suspension support assembly 14 could be a monocoque structure, formed from a single piece of metal, which could have the same shape as the suspension support assembly 14 shown herein, or another shape with a closed cross section. By extending the length of the transition assembly's box beams, a shorter span region is possible. This moves the interference line typically created between a boom arm of loaded equipment and a prior art foremost cross member not only down, but also rearward.

The suspension support assembly 14 of the present bogie 10 has a channel that is formed by a trough section 40 having a horizontally oriented center pan 42, upwardly extending left and right inner sides 44a, 44b integral with left and right longitudinal edges 46a, 46b of the center pan 42, and outwardly extending left and right shoulders 48a, 48b integral with outboard longitudinal edges 50a, 50b of the respective left and right inner sides 44a, 44b. The integral nature of the trough section 40 can be accomplished by forming the trough section 40 of a single plate of metal. In other examples, the center pan 42, inner sides 44a, 44b, and shoulders 48a, 48b are not integral with one another, but rather are welded together along their longitudinal edges. The suspension support assembly 14 also includes left and right outer side plates 52a, 52b extending downwardly from outboard longitudinal edges 54a, 54b of the left and right shoulders 48a, 48b, respectively, and extending parallel to the longitudinal axis of the suspension support assembly 14. The left and right outer side plates 52a, 52b connect the trough section 40 to a bottom plate 56, which completes the closed cross section of the suspension support assembly 14. The upper rear ends 22a, 22b of the left and right arms 16a, 16b of the transition assembly 18 are aligned with and connected to respective front ends of the left and right shoulders 48a, 48b of the trough section 40 and respective front ends of the left and right outer side plates 52a, 52b.

The suspension support assembly 14 further comprises the horizontally oriented bottom plate 56 spaced below the trough section 40. The left and right outer side plates 52a, 52b that extend from the left and right shoulders 48a, 48b of the trough section 40 are connected to left and right sides of the bottom plate 56, respectively. At least one vertically oriented brace plate 58a-c extends transversely between the left and right outer side plates 52a, 52b and between the center pan 42 and the bottom plate 56. Referring to FIGS. 3 and 4, in the present example, first, second, and third vertically oriented brace plates 58a, 58b, 58c extend transversely between the left and right outer side plates 52a, 52b and between the center pan 42 and the bottom plate 56. The first brace plate 58a closes off a front end 60 of the suspension support assembly 14, the second brace plate 58b closes off a rear end 62 of the suspension support assembly 14, and the third brace plate 58c is located approximately halfway between the front and rear ends 60, 62 of the suspension support assembly 14. Additional reinforcing plates may be provided within the box beams on either side of the first brace plate 58a. Any or all of the brace plates 58a-c could be doubled-up to provide extra reinforcement, such that two plates are provided parallel and side by side within the closed cross section of the suspension support assembly 14.

As mentioned, the trough section 40; the bottom plate 56; the left and right outer side plates 52a, 52b; and the first, second, and third brace plates 58a-c are welded to one another. The trough section 40 can be thought of as being "nested" inside the combination of the bottom plate 56, outer side plates 52a, 52b, and brace plates 58a-c, which together mimic the shape of the trough section 40 and cradle the trough section 40 therein. The way the two structural pieces of the trough section 40 and the bottom plate 56 are flanged together by way of the brace plates 58a-c and the outer side plates 52a, 52b resists lateral loads, which eliminates the problem of cracking at prior art cross members 104 due to wheel side drag forces. The geometry and closed cross section of the present suspension support assembly 14 also takes twist loads better than the prior art design utilizing two longitudinal main beams 102 and cross members 104. Additionally, because the brace plates 58a-c are laser cut, they do not require forming and are less expensive than traditional I-beam transverse members.

Note that the transition assembly 18 and the suspension support assembly 14 can be bolted and/or welded together, and/or some or all of the surfaces thereof can be integral with one another. Additionally, the joint between the two assemblies 14, 18 need not be vertical, but instead could be at an angle. The inner sides 44a, 44b of the trough section 40 need not be angled outwardly from the center pan 42, but could be perpendicular with respect thereto. The outer side plates 52a, 52b need not be vertical, but could instead be angled with respect to the shoulders 48a, 48b and the bottom plate 56.

The suspension support assembly 14 also includes at least one pair of bolsters 12a-d extending transversely with respect to the bogie 10 and cantilevered from opposite longitudinal sides thereof. According to the present example, the first brace plate 58a is aligned with a front pair of bolsters 12a, 12b, the third brace plate 58c is aligned with a rear pair of bolsters 12c, 12d, and the second brace plate 58b is aligned with a pair of light bars 64a, 64b extending horizontally outwardly from left 66 and right sides 68 of the suspension support assembly 14, respectively. The light bars 64a, 64b (sometimes called a rear border) act as load supporting members and can receive an equalizer or spreader. The closed cross section for the suspension support assembly 14 can hold loads on the bolsters 12a-d and the light bars 64a, 64b better than can the prior art design. The front pair of bolsters 12a, 12b is cantilevered from the side plates 70a, 71b of the arms 16a, 16b, respectively. The middle pair of bolsters is cantilevered from the outer side plates 52a, 52b, respectively. Note that the bolsters could have shapes other than those shown herein, and fewer or more bolsters could be provided.

According to the present disclosure, at least one of the trough section 40, the bottom plate 56, and the left and right outer side plates 52a, 52b has cutouts therein. These cutouts provide weight savings and provide access to brake chambers, air lines, etc., which can reside within the closed cross section between the trough section 40 and the bottom plate 56. For example, referring to FIG. 6, in the present example, the trough section 40 has cutouts 84 in the center pan 42, and the bottom plate 56 has cutouts 86. Referring to FIGS. 3 and 4, the trough section 40 also has cutouts 88 in the inner sides 44a, 44b. Air tanks can fit into these side cutouts 88 and are protected by the closed section. The left and right outer side plates 52a, 52b have circular cutouts 90 therein, although not every circular cutout is labelled for purposes of clarity of the drawings. Note that there are no cutouts 84, 86, 88, 90 on the trough section 40, the bottom plate 56, or the left and right outer side plates 52a, 52b that are aligned with the first, second, or third brace plates 58a-c. This ensures that the brace plates 58a-c are connected along their full height and length to the remainder of the suspension support assembly 14.

Note that except in the areas of the cutouts, at least a portion of the suspension support assembly 14 has a closed cross section when viewed along a longitudinal axis of the suspension support assembly 14. As noted herein above, this provides the rear suspension support assembly with the ability to withstand loads while reducing the assembly's weight and part count. Additionally, at least a portion of the transition assembly 18 has a closed cross section when viewed along a longitudinal axis of the transition assembly 18. More specifically, at least a portion of each respective left and right arm 16a, 16b has a closed cross section when viewed along a longitudinal axis of the respective left or right arm 16a, 16b. For example, each respective left and right arm 16a, 16b comprises a box beam.

As noted herein above, conventional bogies have implemented multiple add-on piece parts to combat durability issues seen with I-beam longitudinal and transverse members. By selecting different cross-sections and unitizing the suspension support region, resultant stresses are better managed, thus requiring fewer piece parts. The present design thereby mitigates known durability and fatigue issues generally exhibited from turning, transverse, and torsional loads. Unitization and simplification of the transition region and suspension support region in turn reduce assembly time. Overall structural component count, overall structural weight, and time and cost to manufacture the structure are all reduced. Additionally, the single, structural weldment of the present disclosure can accommodate multiple brake technologies to account for future trailer braking trends. With box beams and a unitized span section, all electrical and pneumatic components inherit increased impact protection. Alteration of the foremost cross member allows equipment with boom arms to be positioned lower when in transport.

According to one example of the present disclosure, a bogie 10 for a lowboy trailer 112 includes a front transition assembly 18 comprising parallel left and right arms 16a, 16b, each of the left and right arms 16a, 16b having a lower front end 20a, 20b, an upper rear end 22a, 22b, and an intermediate crest region 24a, 24b connecting the lower front end 20a, 20b to the upper rear end 22a, 22b. A rear suspension support assembly 14 comprises a trough section 40 having a horizontally oriented center pan 42, upwardly extending left and right inner sides 44a, 44b integral with left and right longitudinal edges 46a, 46b of the center pan 42, and outwardly extending left and right shoulders 48a, 48b integral with outboard longitudinal edges 50a, 50b of the respective left and right inner sides 44a, 44b; left and right outer side plates 52a, 52b extending downwardly from outboard longitudinal edges 54a, 54b of the left and right shoulders 48a, 48b, respectively; and at least one pair of bolsters 12a, 12b and/or 12c, 12d extending horizontally outwardly from the left and right outer side plates 52a, 52b, respectively. The upper rear ends 22a, 22b of the left and right arms 16a, 16b of the transition assembly 18 are aligned with and connected to respective front ends of the left and right shoulders 48a, 48b of the trough section 40 and respective front ends of the left and right outer side plates 52a, 52b.

According to another example, a bogie 10 for a lowboy trailer 112 includes a front transition assembly 18 comprising parallel left and right arms 16a, 16b, each of the left and right arms 16a, 16b having a lower front end 20a, 20b, an upper rear end 22a, 22b, and an intermediate crest region 24a, 24b connecting the lower front end 20a, 20b to the upper rear end 22a, 22b; and a rear suspension support assembly 14 coupled to the transition assembly 18 and comprising at least one pair of bolsters 12a, 12b and/or 12c, 12d extending horizontally outwardly from opposing sides of the suspension assembly 14. Each intermediate crest region 24a, 24b on the respective left and right arms 16a, 16b of the transition assembly 18 comprises an undersurface having a vertical segment 36 that is closer to the lower front end 20a, 20b than to the upper rear end 22a, 22b, a horizontal segment 34a that is closer to the upper rear end 22a, 22b than to the lower front end 20a, 20b, and a radiused corner 38 connecting the vertical and horizontal segments. The radiused corner 38 is configured to hold an actuator for an air disc brake when a suspension assembly equipped with an air disc brake is coupled to the bogie 10.

According to yet another example of the present disclosure, a bogie 10 for a lowboy trailer 112 includes a front transition assembly 18 comprising parallel left and right arms 16a, 16b and a rear suspension support assembly 14 coupled to respective upper rear ends 22a, 22b of the left and right arms 16a, 16b of the transition assembly 18. The suspension support assembly 14 comprises a trough section 40 having a horizontally oriented center pan 42, upwardly extending left and right inner sides 44a, 44b integral with left and right longitudinal edges 46a, 46b of the center pan 42, and outwardly extending left and right shoulders 48a, 48b integral with outboard longitudinal edges 50a, 50b of the respective left and right inner sides 44a, 44b; a horizontally oriented bottom plate 56 spaced below the trough section 40; left and right outer side plates 52a, 52b extending downwardly from outboard longitudinal edges 54a, 54b of the left and right shoulders 48a, 48b, respectively, and connected to left and right sides of the bottom plate 56, respectively; at least one pair of bolsters 12a, 12b and/or 12c, 12d extending horizontally outwardly from the left and right outer side plates 52a, 52b, respectively; and at least one vertically oriented brace plate 58a-c extending transversely between the left and right outer side plates 52a, 52b and between the center pan 42 and the bottom plate 56. At least one of the trough section 40, the bottom plate 56, and the left and right outer side plates 52a, 52b has cutouts therein.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A bogie for a lowboy trailer, the bogie comprising:
a rear suspension support assembly configured to carry a suspension system of the lowboy trailer thereunder; and
a front transition assembly coupled to a front end of the suspension support assembly and configured to couple the suspension support assembly to a lower deck of the lowboy trailer;
wherein at least a portion of the suspension support assembly has a closed cross section when viewed along a longitudinal axis of the suspension support assembly;
wherein at least a portion of the transition assembly has a closed cross section when viewed along a longitudinal axis of the transition assembly;
wherein the transition assembly comprises parallel left and right arms and each of the left and right arms has a lower front end coupled to the lower deck, an upper rear end coupled to the front end of the suspension support assembly, and an intermediate crest region connecting the lower front end to the upper rear end; and
wherein each of the left and right arms comprises a bottom plate including:
a bottom angled portion extending from the lower front end of the respective left or right arm to the intermediate crest region thereof; and
a bottom horizontal portion extending from the intermediate crest region to the upper rear end of the respective left or right arm;
wherein the intermediate crest region comprises a vertical portion extending upwardly from the bottom angled portion and a radiused corner connecting the vertical portion to the bottom horizontal portion.

2. The bogie of claim 1, wherein each of the left and right arms comprises a box beam.

3. A bogie for a lowboy trailer, the bogie comprising:
a rear suspension support assembly configured to carry a suspension system of the lowboy trailer thereunder; and
a front transition assembly coupled to a front end of the suspension support assembly and configured to couple the suspension support assembly to a lower deck of the lowboy trailer;
wherein at least a portion of the suspension support assembly has a closed cross section when viewed along a longitudinal axis of the suspension support assembly;
wherein at least a portion of the transition assembly has a closed cross section when viewed along a longitudinal axis of the transition assembly; and
wherein the suspension support assembly comprises:
a trough section having a horizontally oriented center pan;
a horizontally oriented bottom plate spaced below the trough section; and
left and right outer side plates extending parallel to the longitudinal axis of the suspension support assembly and connecting the trough section to the bottom plate.

4. The bogie of claim 3, wherein the suspension support assembly further comprises at least one vertically oriented brace plate extending transversely between the left and right outer side plates and between the center pan and the bottom plate.

5. The bogie of claim 4, wherein the at least one vertically oriented brace plate comprises first, second, and third vertically oriented brace plates extending transversely between the left and right outer side plates and between the center pan and the bottom plate, wherein the first brace plate closes off the front end of the suspension support assembly, the second brace plate closes off a rear end of the suspension support assembly, and the third brace plate is located approximately halfway between the front and rear ends of the suspension support assembly.

6. The bogie of claim 3, wherein:
the trough section further comprises upwardly extending left and right inner sides integral with left and right longitudinal edges of the center pan, and outwardly extending left and right shoulders integral with outboard longitudinal edges of the respective left and right inner sides;

the left and right outer side plates extend downwardly from outboard longitudinal edges of the left and right shoulders, respectively;

the transition assembly comprises parallel left and right arms, and each of the left and right arms has a lower front end, an upper rear end, and an intermediate crest region connecting the lower front end to the upper rear end; and the upper rear ends of the left and right arms are aligned with and connected to respective front ends of the left and right shoulders of the trough section and to respective front ends of the left and right outer side plates.

7. The bogie of claim 3, further comprising at least one pair of bolsters extending transversely with respect to the bogie and cantilevered from opposite longitudinal sides thereof.

8. A bogie for a lowboy trailer, the bogie comprising:

a front transition assembly comprising parallel left and right arms, each of the left and right arms having a lower front end, an upper rear end, and an intermediate crest region connecting the lower front end to the upper rear end; and a rear suspension support assembly coupled to the upper rear ends of the left and right arms of the transition assembly, the suspension support assembly including a trough section having a horizontally oriented center pan;

wherein each intermediate crest region on the respective left and right arms of the transition assembly comprises an undersurface including a radiused corner having an angle of less than 100 degrees; and wherein at least a portion of the suspension support assembly has a closed cross section when viewed along a longitudinal axis of the suspension support assembly, and the suspension support assembly further includes:

a horizontally oriented bottom plate spaced below the trough section; and left and right outer side plates extending parallel to the longitudinal axis of the suspension support assembly and connecting the trough section to the bottom plate.

9. The bogie of claim 8, wherein at least a portion of each respective left and right arm has a closed cross section when viewed along a longitudinal axis of the respective left or right arm.

10. The bogie of claim 9, wherein each respective left and right arm comprises a box beam.

11. The bogie of claim 9, wherein each respective left and right arm includes a top plate comprising:

a top angled portion extending from the lower front end of the respective left or right arm to the intermediate crest region thereof; and a top horizontal portion extending from the intermediate crest region to the upper rear end of the respective left or right arm;

wherein the intermediate crest region comprises an arced section connecting the top angled portion to the top horizontal portion.

12. The bogie of claim 11, wherein each respective left and right arm includes a bottom plate comprising:

the undersurface of the intermediate crest region, the undersurface comprising a vertical segment that is closer to the lower front end of the respective left or right arm than to the upper rear end thereof, a horizontal segment that is closer to the upper rear end than to the lower front end, and the radiused corner, which connects the vertical and horizontal segments of the undersurface;

a bottom angled portion extending from the lower front end of the respective left or right arm to the vertical segment of the undersurface; and a bottom horizontal portion extending from the horizontal segment of the undersurface to the upper rear end of the respective left or right arm.

13. The bogie of claim 8, wherein:

the trough section has upwardly extending left and right inner sides integral with left and right longitudinal edges of the center pan and outwardly extending left and right shoulders integral with outboard longitudinal edges of the respective left and right inner sides; and the left and right outer side plates extend downwardly from outboard longitudinal edges of the left and right shoulders, respectively, and are connected to left and right sides of the bottom plate, respectively.

14. The bogie of claim 13, wherein the upper rear ends of the left and right arms are aligned with and connected to respective front ends of the left and right shoulders of the trough section and to respective front ends of the left and right outer side plates.

15. The bogie of claim 8, wherein the suspension support assembly has at least one vertically oriented brace plate extending transversely between the left and right outer side plates and between the center pan and the bottom plate.

16. The bogie of claim 15, wherein the at least one vertically oriented brace plate comprises first, second, and third vertically oriented brace plates extending transversely between the left and right outer side plates and between the center pan and the bottom plate, wherein the first brace plate closes off a front end of the suspension support assembly, the second brace plate closes off a rear end of the suspension support assembly, and the third brace plate is located approximately halfway between the front and rear ends of the suspension support assembly.

* * * * *